May 19, 1942. W. L. POLLARD 2,283,759
TRANSMISSION
Filed May 19, 1939 3 Sheets-Sheet 1

Inventor:
Willard L. Pollard.

May 19, 1942.　　　W. L. POLLARD　　　2,283,759
TRANSMISSION
Filed May 19, 1939　　　3 Sheets-Sheet 2
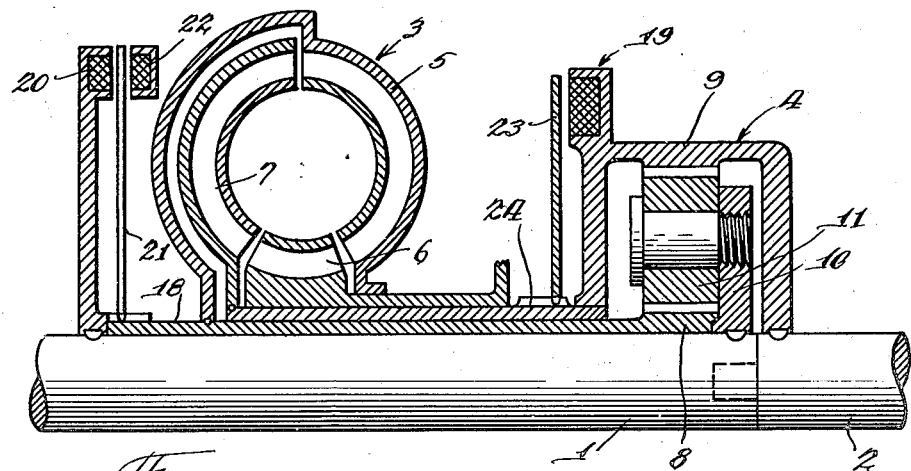
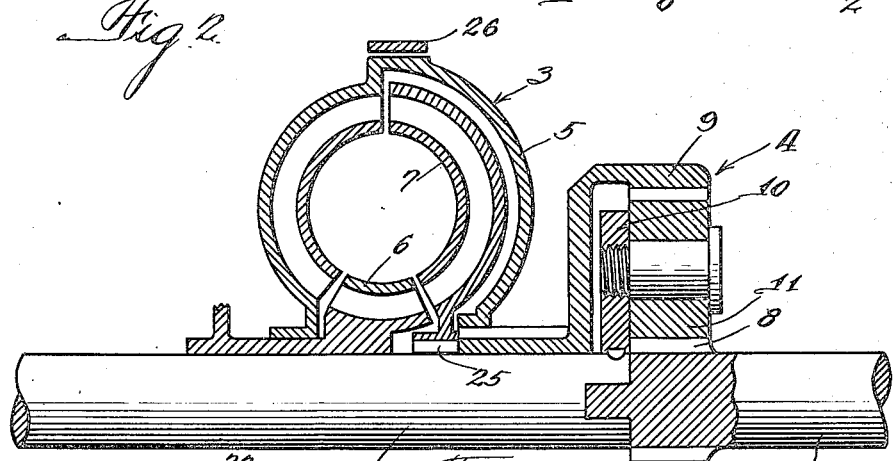
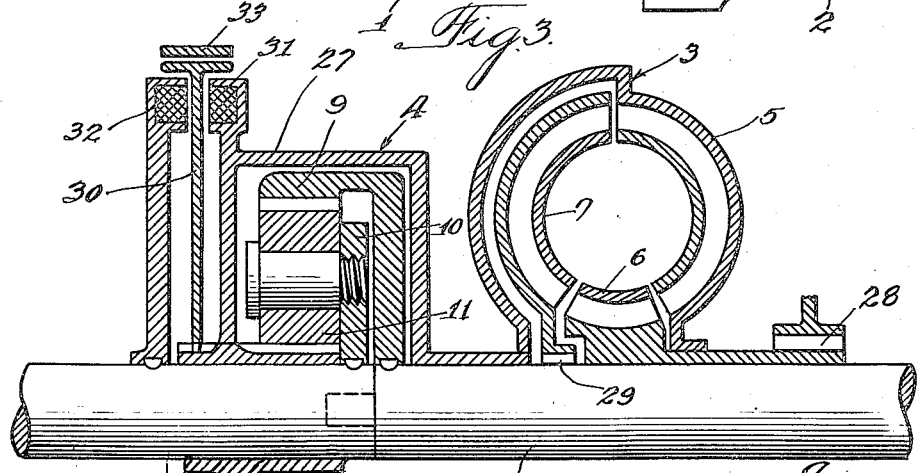

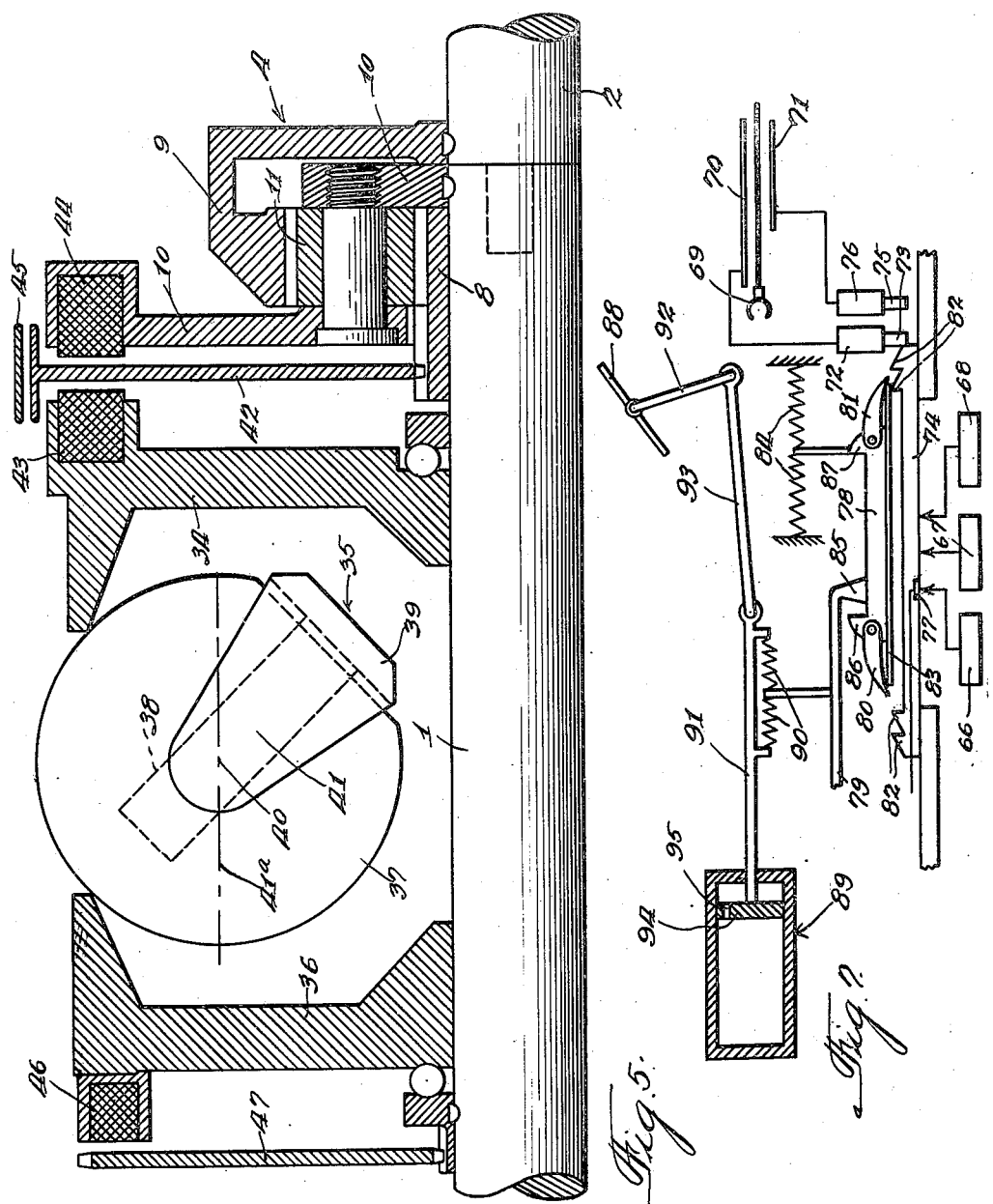

Patented May 19, 1942

2,283,759

UNITED STATES PATENT OFFICE 2,283,759

TRANSMISSION

Willard L. Pollard, Evanston, Ill., assignor to Adiel Y. Dodge, Rockford, Ill.

Application May 19, 1939, Serial No. 274,470

17 Claims. (Cl. 74—189.5)

My invention relates to variable speed transmissions.

One of the objects of my invention is to provide a variable speed transmission including an infinitesimally variable drive and a planetary gear construction in which provision is made for an overdrive.

A further object is to provide a variable speed transmission including an infinitesimally variable drive and a planetary gear construction in which improved means are provided for effecting direct drive.

A further object is to provide a combination of infinitesimally variable drive and planetary gear having two positive speed ratios which are independent of the infinitesimally variable drive.

A further object is to provide a combination infinitesimally variable drive and planetary gear in which the infinitesimally variable torque ratio changing apparatus is designed to have its maximum efficiency at relatively great differences of speed between the drive shaft and driven shaft.

A further object is to provide an improved control mechanism for controlling the speed ratios.

Further objects and advantages of the invention will be apparent from the description and claims.

In the drawings, in which several embodiments of my invention are shown:

Fig. 2 is an axial section showing another form;

Fig. 3 is an axial section showing another form;

Fig. 4 is an axial section showing another form;

Fig. 5 is an axial section showing an infinitesimally variable friction transmission combined with a planetary gear construction;

Fig. 7 is a diagrammatic view of a control apparatus.

Figure 1:
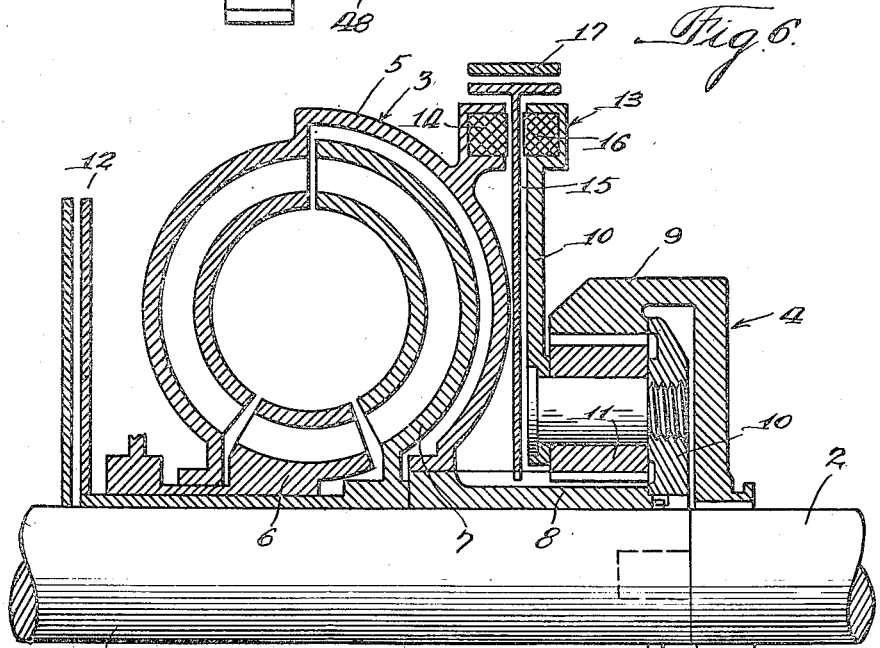
Figure 1 is an axial sectional view showing a hydraulic torque converter combined with a planetary gear construction.

Referring to the drawings in detail, and first to Fig. 1, the construction shown therein comprises a drive shaft 1, a driven shaft 2, a hydraulic torque converter 3, a planetary gear construction 4, and clutch and brake instrumentalities for controlling various rotors.

The hydraulic torque converter may in general be of the Fottinger type comprising a drive rotor 5, a stator 6, and a driven rotor 7. The planetary gear construction comprises a sun gear 8, connectible and disconnectible with respect to the drive rotor 5, a ring gear 9 connected with a driven shaft 2, a gear carrier 10 connected to rotate with the drive shaft 1 and connectible and disconnectible with respect to the sun gear for direct drive, and planetary gearing 11 carried by the gear carrier 10 and meshing with the sun gear 8 and ring gear 9.

The clutch and brake instrumentalities comprise clutch means 12 for connecting and disconnecting the driven rotor 7 with respect to the drive shaft 1, a double acting clutch construction 13 which in one condition connects the drive rotor 5 to rotate with the sun gear 8, in another condition connects the sun gear 8 to rotate with the gear carrier 10 and in another condition a brake which holds the sun gear 8 against rotation.

These clutch and brake instrumentalities may be of any suitable type but as shown comprise electromagnetic means 14 carried by the drive rotor 5 which, when energized, attract the clutch plate 15, which is splined to the sun gear 8, to connect the sun gear 8 with the drive rotor 5, other electromagnetic means 16 carried by the gear carrier 10 which, when energized, attract the clutch plate 15 to cause the sun gear 8 to rotate with the gear carrier 10, and brake means 17 which, when applied by any suitable mechanism, engage the rim of the clutch plate 15 to hold the sun gear 8 against rotation.

With this construction, for infinitesimally variable speeds, the electromagnetic means 16 are energized to attract the clutch plate 15 to lock the drive rotor 5 to the sun gear 8 and the clutch 12 is conditioned to connect the driven rotor 7 to rotate with the drive shaft 1. Under these conditions a regenerative power action takes place, the regenerative power flow being from the drive shaft 1 to the gear carrier 10, thence to the planetary gearing 11 and through the sun gear 8, drive rotor 5, and stator 6 to the driven rotor 7 which, for purposes of infinitesimally variable speed transmission, will be connected to the drive shaft by the clutch instrumentalities 12.

As the hydraulic torque converter 3 effects a torque increase, this increased torque will be transmitted to the drive shaft 1 to increase the torque thereon so that regenerative action is thus obtained. The torque thus brought to bear on the gear carrier 10 will of course be transmitted through the planet gearing 11 to the ring gear 9 on the driven shaft so that theoretically an infinite torque can be exerted on the driven shaft 2 if necessary.

For direct drive, the electromagnet 16 is energized to attract the clutch plate 15 and lock the sun gear 8 to rotate with the gear carrier, thus effecting direct drive. In direct drive the clutch instrumentalities may be set so that the drive rotor 5 is free from the sun gear 8 and the driven rotor 7 is free from the drive shaft 1 so that there will be no rotation of the parts of the hydraulic torque converter.

For overdrive, the brake 17 is applied to hold the sun gear 8 against rotation, the clutch instrumentalities being all released so that there will be no movement of the hydraulic torque converter. With the sun gear held, an overdrive is effected through the planetary gear construction 4 from the drive shaft 1 to the driven shaft 2.

The construction shown in Fig. 2 is similar to that just described except that here the fluid power action takes place directly on the driven shaft instead of on the drive shaft. The hydraulic torque converter and planetary gear construction may be substantially the same as in Fig. 1. In this construction the drive rotor 5 is connected to rotate with the sun gear 8, being mounted on a sleeve 18 extending from the sun gear 8. The driven rotor 7 is connectible and disconnectible with respect to the ring gear 9 by means of a magnetic clutch 19. The sun gear 8 may be connected and disconnected with the drive shaft 1 by means of a magnetic clutch 20 which, when energized, attracts the plate 21 which is splined on the hollow shaft or sleeve 18 rotatable with the sun gear 8. For holding the sun gear 8 against rotation for overdrive, a fixed brake magnet 22 is provided which will attract the friction plate 21 splined to the sun gear to hold the sun gear 8 against rotation. The magnetic clutch 19 acting on a clutch plate 23 splined on the sleeve 24 of the driven rotor serves for connecting and disconnecting the driven rotor 7 with respect to the ring gear 9.

In this construction, for infinitesimally variable drive, the clutch 19 is energized to connect the driven rotor 7 with the ring gear 9, the other magnetic clutches being deenergized. Under these conditions power flows from the drive shaft 1 through the gear carrier 10, planetary gearing 11, sun gear 8, sun gear sleeve 18, drive rotor 5, stator 6, driven rotor 7, sleeve 24, clutch 19, and ring gear 9 to the driven shaft 2.

For direct drive the magnet 19 controlling the connection of the driven rotor 7 with the ring gear 9 is deenergized and the magnet 20 controlling the operation of the clutch plate 21 splined on the sun gear sleeve 18 is energized to connect the sun gear 8 to rotate with the drive shaft 1.

For overdrive, the magnet 22 is energized which attracts the plate 22 splined to the sun gear sleeve 18 and holds the sun gear 8 against rotation.

The construction shown in Fig. 3 is similar to those previously described except that here provision is made for a high overdrive by forming the sun gear 8 of the planetary 4 to rotate with the driven shaft 2. In this form the ring gear 9 is connected to drive the drive rotor 5, and the driven rotor 7 has a one-way clutch connection 25 with the drive shaft 1. In this form for infinitesimally variable speeds, the brake 26 is freed from engagement with the drive rotor 5 and the power flow is from the drive shaft 1 through the gear carrier 10, planetary gearing 11, ring gear 9, drive rotor 5, stator 6, and driven rotor 7 back to the drive shaft 1. As the torque converter increases the torque, additional torque will be transmitted to the drive shaft 1 which torque will recirculate, thus increasing the torque transmitted to the gear carrier 10. For overdrive, the brake 26 is applied to hold the ring gear 9 against rotation, thus effecting a high overdrive of the driven shaft 2 through the gear carrier 10, planetary gearing 11, and sun gear 8.

In Fig. 4 the construction is similar to that shown in Fig. 2 except that here the planetary gearing 4 is placed ahead of the hydraulic torque converter 3. In this construction the sun gear 8 is connectible and disconnectible with a housing 27 which in turn is connected to rotate with the drive rotor 5. The gear carrier 10 is connected to rotate with the drive shaft 1 and the ring gear 9 is connected to rotate with the driven shaft 2. The driven rotor 7 also is connected to rotate with the driven shaft 2. In this form a one-way brake construction 28 is provided which will hold the stator 6 against rotation in one direction but will allow it to pick up and rotate with the rotors 5 and 7 when the speed approaches direct drive. A one-way clutch construction 29 is also provided between the driven rotor 7 and the driven shaft 2 so that when occasion arises the driven shaft 2 may rotate ahead of the driven rotor 7. Suitable three-way clutch instrumentalities are provided, including a clutch plate 30 splined on the sun gear 8, a magnetic clutch controller 31 for connecting the sun gear with the drive rotor 5, a magnetic clutch controller 32 for connecting the sun gear 8 to rotate with the drive shaft 1 for direct drive, and a brake 33 for acting on the rim of the clutch plate 30 to hold the sun gear against rotation for overdrive.

In the construction shown in Fig. 5, the drive shaft 1, the driven shaft 2, and the planetary transmission construction 4 may be substantially as in the forms previously described. In this form, however, infinitesimally variable speed friction apparatus is used instead of a hydraulic torque converter. The infinitesimally variable drive shown comprises a drive rotor 34, a reaction device 35, and a driven rotor 36. The reaction device may comprise a spherical idler 37 mounted to rotate about a shaft 38, the shaft being carried by a yoke 39 pivoted at 40 so that by rotating the yoke 39 about its axis 40 the axis 41 of the spherical idler 37 may be shifted from the position shown at 41 to the position shown at 41a, thus changing the speed ratio between the drive rotor 34 and the driven rotor 36 from substantially infinity to a one-to-one ratio. The details of construction and operation of this variable speed apparatus may be substantially the same as in my Patents No. 2,177,946, dated October 31, 1939, and No. 2,181,380, dated November 28, 1939. Clutch instrumentalities are provided which, in one condition, connect the drive rotor 34 to rotate with the sun gear 8; in another condition, connect the sun gear 8 to rotate with the gear carrier 10 and, in another condition, hold the sun gear against rotation. The instrumentalities shown comprise a clutch plate 42 splined on the sun gear 8, an electromagnetic device 43 which, when energized, will attract the clutch plate 42 to connect the drive rotor 34 with the sun gear 8, another electromagnetic device 44 which, when energized, will attract the clutch plate 42 to connect the sun gear 8 to rotate with the gear carrier 10 for direct drive, and a brake element 45 which, when applied, will hold the sun gear 8 against rotation for overdrive. Clutch means may be provided, for connecting the driven rotor 36 to rotate with the drive shaft 1, comprising an electromagnet 46 which, when energized, will attract the clutch plate 47 which is splined to the drive shaft 1.

In this construction for infinitesimally variable drive, the driven rotor 36 is connected to rotate with the drive shaft 1, and the drive rotor 34 is connected to rotate with the sun gear 8. Means controlled by the speed of the vehicle are provided for controlling the position of the yoke 35 which carries the reaction idler 37. As the speed of the vehicle increases, the axis 41 of the idler moves from the position shown toward the position 41a. Under these conditions, a regenerative power flow is obtained, the flow being from the drive shaft 1, through the gear carrier 10, planet gearing 11, sun gear 8, clutch 43, drive rotor 34, reaction idler 37, driven rotor 36, and clutch 46 back to the drive shaft 1.

As indicated above, for direct drive, the clutches 43 and 46 may be deenergized and the direct drive clutch 44 is energized to connect the sun gear 8 to rotate with the gear carrier 10. For overdrive, the clutches 43, 44 and 46 may be deenergized and the brake 45 is applied to hold the sun gear against rotation.

Figure 6:
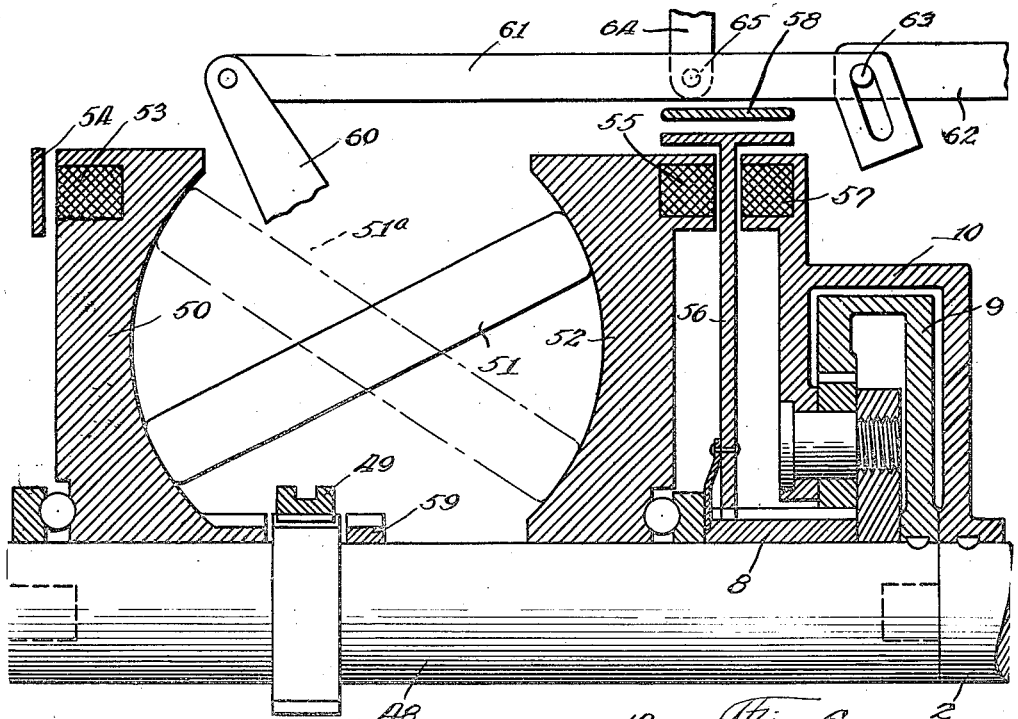
Fig. 6 is an axial sectional view of another form of transmission.

In the construction shown in Fig. 6, the driven shaft 2 is connected to rotate with the gear carrier 10, and the ring gear 9 is connected to a shaft 48 which may either be held against rotation by a member 49 or may be connected by this member 49 to the drive rotor 50 of the variable speed transmission. The variable speed transmission is of the torroidal type comprising the drive rotor 50, the reaction idler 51, and the driven rotor 52. The reaction idler 51 can be shifted from the position shown in full lines to the position shown in dotted lines 51a by suitable means controlled by the speed of the vehicle. A clutch magnet 53 is provided whereby the drive rotor may be connected and disconnected with respect to the driving clutch plate 54. Also, clutch instrumentalities are provided whereby the sun gear 8 may be connected with the driven rotor 52 when desired; may be connected to rotate with the gear carrier 10 when desired, and may be held against rotation when desired. The clutch means for connecting the sun gear 8 with the driven rotor 52 comprise an electromagnetic device 55 carried by the driven rotor 52 which, when energized, attracts the clutch plate 56 which is splined on the sun gear 8. The clutch means for direct drive comprise an electromagnet 57 carried by the gear carrier 10 which, when energized, will attract the clutch plate 56 to lock the sun gear 8 to rotate with the gear carrier 10. The underdrive construction comprises a brake member 58 which, when applied to the band of the clutch plate 56, will hold the clutch plate against rotation and hence hold the sun gear to effect underdrive. For all forward movement of the car, the member 49 is shifted to the left to connect the shaft 48 to rotate with the drive rotor 50. For reverse, the member 49 is shifted to the right into engagement with a fixed member 59 to hold the shaft 48 against rotation. When thus held against rotation, reverse movement of the driven shaft 2 is effected from the drive rotor 50 through the reaction idler 51, driven rotor 52 and sun gear 8, the electromagnet 55 being energized to connect the sun gear 8 to rotate with the driven rotor 52. As this torroidal type of friction drive causes the driven rotor 52 to rotate in the reverse direction from the driving rotor 50, the sun gear 8 also will be rotated in a reverse direction to the driving rotor. As the ring gear 9 is held against rotation by the fixed clutch member 59, the gear carrier 10 will be revolved in a reverse direction, carrying with it the driven shaft 2.

The means controlled by the vehicle speed, for controlling the position of the reaction idlers 51 of Fig. 6 and 37 of Fig. 5, comprise an arm 60 (Fig. 6) secured to the yoke which carries the reaction idler, a link 61 pivotally secured to this arm 60, and a member 62 having a pin and slot connection 63 with this link 61, the position of which member 62 is controlled by the speed of the vehicle. In order to exert a modulated effect on this speed controlled apparatus, a manually operable member 64 may be pivotally connected at 65 to the link which can be moved to change the pin and slot connection between the link and speed-controlled member. A similar control arrangement may be provided for controlling the position of the yoke with the reaction idler shown in Fig. 5.

In Fig. 7 is shown diagrammatically a control for various clutch instrumentalities. It is assumed that when current is supplied to the electrical device 66, the clutch instrumentalities will be so controlled that infinitesimally variable speed conditions prevail, so that when the second electromagnetic device 67 is energized the clutch controlling instrumentalities will be in condition to effect direct drive and so that when the third electromagnetic device 68 is energized the sun gear will be held against rotation for overdrive. In the diagrammatic showing a current supply contact 69 is variably positioned in accordance with the speed of the vehicle so that, for example, in speeds from zero to ten miles per hour, the movable current supply contact 69 will be out of engagement with both of the contact strips 70 and 71; so that in speeds of from ten to thirty miles per hour the movable contact 69 will be in engagement with the contact strip 70 but not in engagement with the other contact strip 71, and so that in speeds above thirty miles per hour the movable contact 69 will be in engagement with both contact strips 70 and 71. The arrangement is such that when current is supplied to the contact strip 70, the electromagnet 72 will be energized to withdraw the blocking member 73 from blocking position with respect to the foot controlled contact carrying slide 74 and so that when the shiftable contact 69 is in engagement with both contact strips 70 and 71, both of the blocking members 73 and 75 of the two solenoids 72 and 76 will be withdrawn from blocking position with respect to the contact carrying slide 74.

This slide member 74, as will be described hereinafter, is designed so as to be controlled by the accelerator pedal and may be shifted to any one of three positions in which the contact 77 carried by the slide will be brought into position to energize any one of the three electromagnetic devices 66, 67, and 68 for establishing as desired an infinitesimally variable speed, a direct drive, or an overdrive.

The throttle controlled means for controlling the position of this slide 74 comprise a slide 78 having a lost motion connection with the accelerator controlled link 79 and a pair of pawls 80 and 81, one pivoted at each end of the slide for engagement with ratchet teeth 82 on the slide 74. Suitable baffles or rests 83 are provided for raising the pawls 80 and 81 out of engagement with the ratchet teeth 82 when the slide is in its normal mid-position in which position it may be held normally by means of any suitable construction such as springs 84. The slide 74 is provided with two ratchet teeth 82 at each end thereof for cooperation with the pawls 80 and 81. With this construction, the normal operating range of the accelerator pedal will move the operating head 85 of the pedal operated link 79 from a position adjacent one of the abutments 86 on the slide to a position adjacent the other abutment 87. Movement beyond this range will effect movement of the slide 78 for causing the pawls 80 to operate the ratchet carrying slide 74. With this construction, if the speed of the vehicle is below ten miles per hour, the abutment 73 will prevent operation of the slide 74. If the speed is above ten miles per hour but below thirty miles per hour, the blocking member 73 of the solenoid will be withdrawn so that the driver, if he wishes to shift from variable speed to direct drive, will momentarily push the throttle down as far as possible to effect a one-step movement of the slide 74. When the foot is lifted slightly to allow the pawl-carrying slide 78 to return to normal position, under the action of the springs 84, the contact-carrying slide 74 will remain in direct drive position. If now the speed of the vehicle is increased to something above thirty miles per hour, both blocking members 73 and 75 will be withdrawn and if the driver wishes to go from direct to overdrive, he will be able to accomplish this by again depressing the accelerator to its extreme position which will give another step movement to the contact carrying slide 74 and establish overdrive conditions. To go from overdrive back to direct drive or to variable speed drive, it is only necessary to completely release the accelerator momentarily which will cause the projection 85 on the link 79 to move the pawl-carrying slide 78 to the left to effect a one-step movement of the contact-carrying slide 74 which will bring the contact-carrying slide into direct drive position. To drop from direct down to variable speed, the accelerator pedal is again momentarily fully released to effect another step movement of the contact-carrying slide.

In order to prevent undue fluctuation of the throttle valve 88 when the accelerator pedal is momentarily moved back and forth to effect change in speed ratio, a yielding dashpot connection may be provided between the pedal operated member 79 and the throttle valve 88. The construction shown for this purpose comprises a dashpot 89 having a yielding connection 90 with the member 79, the piston rod 91 of the dashpot being connected with the throttle valve lever 92 by means of a link 93. The piston 94 of the dashpot has a small opening 95, permitting a restricted flow of fluid therethrough. With this construction a momentary back-and-forth movement of the member 79 will not cause any great movement of the dashpot piston 94, the springs 90 yielding to permit the back-and-forth movement of the member 79 and the dashpot serving to retard the movement of the throttle valve 88.

In those embodiments of my invention making use of the hydraulic torque converter, the converter may be designed by known practice so that it will have its maximum efficiency at relatively great differences of speed between the drive shaft and driven shaft. Such a design is especially advantageous in connection with the planetary combination shown because of the fact that at relatively great speed differences, the proportion of power supplied through the hydraulic converter is relatively great and at relatively small speed differences, the proportion of power supplied through the hydraulic converter is relatively small. Referring, for example, to the form shown in Figs. 1, 2 and 4, if the sun gear has a pitch diameter of two inches and the ring gear a pitch diameter of four and one-half inches, the torque transmitted direct from the motor to the ring gear (disregarding losses due to inefficiency) will be nine-thirteenths of the motor torque. If the torque required at the propeller shaft (driven shaft) is three times the motor torque, the difference between this propeller torque (three times the motor torque) and direct torque supplied to the ring gear (two-thirds the motor torque) will have to be supplied through the fluid torque converter. This would make the torque supplied through the fluid torque converter two and one-thirds times the motor torque, which is practically seventy-seven per cent of the total torque supplied to the propeller shaft.

If, however, the torque required at the propeller shaft is only twice that of the motor shaft, a computation similar to the above will show that only sixty-five per cent of the propeller torque is supplied through the converter. If the torque required at the propeller shaft is only equal to the motor torque, a similar computation shows that only about thirty per cent of the torque required will have to be supplied through the fluid torque converter.

If, as in present automobile practice, the maximum torque ratio required between the motor shaft and the propeller shaft is about 3:1, it is believed that it would be desirable to design the fluid torque converter so that its maximum efficiency would be at about this ratio so that as the torque ratio lessens and the loss in efficiency increases, this higher percentage of loss in efficiency will be effective on a smaller proportion of the total power flow.

Further modifications will be apparent to those skilled in the art and it is desired, therefore, that the invention be limited only by the prior art and the scope of the appended claims.

Having thus described my invention, what I claim and desire to secure by Letters Patent is:

1. A variable speed transmission comprising a drive shaft, a driven shaft coaxial therewith, and means for transmitting power between said shafts comprising a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and one of said shafts, means for holding said sun gear against rotation to effect overdrive of said driven shaft through the planetary gear construction, and means for disconnecting said torque converter from power transmission relationship with respect to said sun gear.

2. A variable speed transmission comprising a drive shaft, a driven shaft coaxial therewith, and means for transmitting power between said shafts comprising a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and one of said shafts, means for holding said sun gear against rotation to effect overdrive of said driven shaft through the planetary gear construction, and means for disconnecting said torque converter from power transmission relationship with respect to one of said shafts.

3. A variable speed transmission comprising a drive shaft, a driven shaft coaxial therewith, and means for transmitting power between said shafts comprising a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and one of said shafts, means for holding said sun gear against rotation to effect overdrive of said driven shaft through the planetary gear construction, means for disconnecting said torque converter from power transmission relationship with respect to said sun gear, and means for connecting said sun gear to rotate in unison with the drive shaft for direct drive.

4. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and one of said shafts, means for disconnecting said torque converter from power transmission relation between said sun gear and shaft, and means for holding said sun gear against rotation to effect overdrive of said driven shaft through the planetary gear construction.

5. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said drive shaft, means for disconnecting said torque converter from power transmission relation between said sun gear and shaft, and means for holding said sun gear against rotation to effect overdrive of said driven shaft through the planetary gear construction.

6. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said driven shaft, means for disconnecting said torque converter from power transmission relation between said sun gear and shaft, and means for holding said gun gear against rotation to effect overdrive of said driven shaft through the planetary gear construction.

7. A variable speed transmission comprising a drive shaft, a driven shaft coaxial therewith, and means for transmitting power between said shafts comprising a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said drive shaft, means for disconnecting said torque converter from power transmission relation between said sun gear and shaft, and means for holding said sun gear against rotation to effect overdrive of said driven shaft through the planetary gear construction.

8. A variable speed transmission comprising a drive shaft, a driven shaft coaxial therewith, and means for transmitting power between said shafts comprising a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said driven shaft, means for disconnecting said torque converter from power transmission relation between said sun gear and shaft, and means for holding said sun gear against rotation to effect overdrive of said driven shaft through the planetary gear construction.

9. A variable speed transmission comprising a drive shaft, a driven shaft coaxial therewith, a fluid torque converter and a planetary gear construction, said fluid torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft, and said torque converter serving to transmit power between said sun gear and one of said shafts, said drive rotor being connected to rotate with the sun gear and said driven rotor being connected to rotate with the drive shaft.

10. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said driven shaft, and clutch means for disconnecting said torque converter from power transmission relation between said sun gear and driven shaft.

11. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, said ring gear being connected to rotate with said driven shaft and said torque converter serving to transmit power between said sun gear and said driven shaft, clutch means for disconnecting said torque converter from power transmission relation between said sun gear and driven shaft and clutch means for connecting said sun gear to rotate with said drive shaft.

12. A variable speed transmission comprising a drive shaft, a driven shaft coaxial therewith, and means for transmitting power between said shafts comprising a torque converter and a planetary gear construction, said torque converter comprising a drive rotor, a stator and a driven rotor, said planetary gear construction comprising a sun gear, a ring gear, a gear carrier and planetary gearing carried by said gear carrier and meshing with said sun gear and ring gear, said gear carrier being connected to rotate with said drive shaft, one of said gears being connected to rotate with the driven shaft, said torque converter serving to transmit power between the other one of said gears and said driven shaft, and clutch means for disconnecting said torque converter from power transmission relation between said other one of said gears and said driven shaft.

13. A transmission for connecting driving and driven shafts comprising a hydraulic torque transmitting device having driving and driven members, a differential gear set, means for connecting one element of the gear set to one of said members, means for connecting another element of the gear set to the other of said members, one of said members being connected to one of the shafts and the other shaft being connected to a third element of the gear set and one of said connecting means being a clutch, whereby the transmission can be changed from a two-path to a single path drive.

14. A transmission for connecting driving and driven shafts comprising a hydraulic torque transmitting device having driving and driven members, a differential gear set, the driving shaft being connected to one element of the gear set, means connecting another element of the gear set to one of said members, and clutch means for connecting a third element of the gear set to the other of said members, said third element and said other member being connected to the driven shaft when said clutch means is engaged.

15. A transmission for connecting driving and driven shafts comprising a hydraulic torque transmitting device having driving and driven members, a differential gear set, including a gear carrier carrying planet pinions meshing with sun and ring gears, the driving shaft being connected to said gear carrier, means connecting one of said gears to one of said members, and clutch means for connecting the other of said gears to the other of said members, said last named gear and member being connected to the driven shaft when said clutch means is engaged.

16. A transmission for connecting driving and driven shafts comprising a differential gear set having one element connected to the driving shaft and another element connected to the driven shaft, a hydraulic torque transmitting device having driving and driven members, means for connecting another element of the gear set to the driving member, means for connecting the driven member to the driving shaft to provide a regenerative power circuit, and clutch means to provide a mechanical connection for one-to-one drive between the driving and driven shafts.

17. A transmission for connecting driving and driven shafts comprising a differential gear set having one element connected to the driving shaft and another element connected to the driven shaft, a hydraulic torque converter having a vaned driving member, a vaned driven member and a vaned reactance member, means for connecting another element of the gear set to the driving member, means for connecting the driven member to the driving shaft to provide a regenerative power circuit, and clutch means to provide a mechanical connection for one-to-one drive between the driving and driven shafts.

WILLARD L. POLLARD.

DISCLAIMER 2,283,759.—*Willard L. Pollard*, Evanston, Ill. TRANSMISSION. Patent dated May 19, 1942. Disclaimer filed December 10, 1943, by the assignee, *Adiel Y. Dodge*.

Hereby enters this disclaimer to claim 9 in said specification.

[*Official Gazette January 4, 1944.*]